US012644545B2

(12) United States Patent
Geno et al.

(10) Patent No.: US 12,644,545 B2
(45) Date of Patent: *Jun. 2, 2026

(54) UNIVERSAL COUPLING

(71) Applicant: ADVANCED DRAINAGE SYSTEMS, INC., Hilliard, OH (US)

(72) Inventors: Evan Joseph Geno, Malinta, OH (US); Matthew Huizenga, Dublin, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/915,599

(22) Filed: Oct. 15, 2024

(65) Prior Publication Data

US 2025/0035241 A1      Jan. 30, 2025

Related U.S. Application Data

(63) Continuation of application No. 18/170,680, filed on Feb. 17, 2023, now Pat. No. 12,140,252.

(51) Int. Cl.
F16L 21/00          (2006.01)

(52) U.S. Cl.
CPC ................................. F16L 21/007 (2013.01)

(58) Field of Classification Search
CPC ..... F16L 21/007; F16L 21/002; F16L 33/003; F16L 33/006
USPC ................................... 285/903, 239, 240, 12
See application file for complete search history.

(56) References Cited

U.S. PATENT DOCUMENTS

| | | | |
|---|---|---|---|
| 2,139,745 A | 12/1938 | Goodall | |
| 3,471,179 A | 10/1969 | Sixt | |
| 4,286,808 A | 9/1981 | Fouss | |
| 4,603,890 A | 8/1986 | Huppee | |
| 5,165,733 A | 11/1992 | Sampson | |
| 5,487,571 A | 1/1996 | Robertson | |
| 5,853,202 A | 12/1998 | Li | |
| 8,287,007 B2 | 10/2012 | Reiter | |
| 8,485,561 B2 | 7/2013 | Guo | |
| 8,833,398 B2 | 9/2014 | Williams | |
| 10,107,430 B2 | 10/2018 | Birkholz | |
| 11,692,655 B2 | 7/2023 | Kury | |
| 12,140,252 B2 * | 11/2024 | Geno | .................... F16L 21/002 |
| 2008/0267709 A1 | 10/2008 | Terry | |
| 2009/0021003 A1 | 1/2009 | Poupore | |
| 2015/0330544 A1 | 11/2015 | Sorkin | |
| 2020/0296883 A1 | 9/2020 | Thompson | |

FOREIGN PATENT DOCUMENTS

| | | |
|---|---|---|
| FR | 2259309 | 8/1975 |

OTHER PUBLICATIONS

International Search Report and Written Opinion for PCT/US2024/016181 dated May 31, 2024; 15 pages.

* cited by examiner

*Primary Examiner* — David Bochna

(74) *Attorney, Agent, or Firm* — FINNEGAN, HENDERSON, FARABOW, GARRETT & DUNNER L.L.P.

(57)          ABSTRACT

A coupling configured to connect a first pipe to a plurality of pipes comprising a first end and a second end, wherein the second end is tapered and comprises a plurality of lateral ribs and a plurality of longitudinal ribs, wherein each of the plurality of longitudinal ribs comprises a pliable and wedge-like shape, and each of the plurality of longitudinal ribs tapers toward the second end.

20 Claims, 9 Drawing Sheets

100

100

UNIVERSAL COUPLING

CROSS REFERENCE TO RELATED APPLICATIONS

The present application is a continuation of U.S. application Ser. No. 18/170,680 filed on Feb. 17, 2023, now U.S. Pat. No. 12,140,252which is incorporated herein by reference in its entirety.

TECHNICAL FIELD

The present disclosure relates to couplings for connecting pipes and corrugated pipes. In particular, the present disclosure relates to a universal coupling for a pipe, which may also be used to connect various pipes or as a universal adapter, and may create a secure connection.

BACKGROUND

Couplings connecting pipes and adapters for pipes allow for user(s) and/or practitioner(s) to connect and fit pipes. Current practices allow for a coupling to connect one pipe to another pipe or for an adapter to fit pipes together. However, compatibility issues in current couplings and adapters may not allow for the quick, facile, and snug fit of one pipe to various pipes, especially wherein such various pipes have different inner diameters. Moreover, current couplings and adapters may not allow for the secure fitting of such pipes in an effective manner. For example, current couplings and adapters may not comprise structure(s) that allows for a secure, snug, and facile fitting of one pipe to another one pipe, let alone such a secure fitting of one pipe to various pipes wherein such various pipes have different inner diameters. Therefore, since current couplings and adapters may not comprise such structure(s) required for a secure, snug, and facile pipe fitting, these current couplings and adapters hinder the fitting of different pipes with various inner diameters.

Given this, there exists an overwhelming need for a compatible coupling and adapter that allows a user(s) and/or practitioner(s) to connect one pipe to various other pipes of different inner diameters in a fit that is snug and secure, in a quick, facile, and effective manner. Such a compatible coupling or adapter will require structure(s) that allows for such a snug and secure fit in a quick, facile and effective manner.

SUMMARY

Different from conventional solutions, the present disclosure solves the above problem(s) by providing a coupling, which may serve as both a coupling and adapter, that allows a user(s) and/or practitioner(s) to connect and fit one pipe to pipes of various inner diameters. As used herein, the terms coupling and adapter may be used interchangeably. For example, the term coupling may be used to refer to a feature that couples two pipes together. The term coupling may also be used to refer to an adapter that is used to fit one pipe to pipes of various inner diameters. The use of the term coupling is not meant to be limiting and should be construed commensurate with how the term coupling is understood in the art. The present disclosure further provides the coupling and adapter with structure(s) that allow for a secure, snug, quick, effective, and facile fitting of one pipe to various pipes, wherein such various pipes have different inner diameters. Thus, the present disclosure allows for a compatible and versatile coupling and adapter.

In one embodiment, a coupling connecting a first pipe to a plurality of pipes comprises a first end configured to connect the first pipe and a second end configured to connect the plurality of pipes, wherein the second end is a tapered end that comprises a plurality of lateral ribs and a plurality of longitudinal ribs, wherein each of the plurality of longitudinal ribs comprises a pliable and wedge-like shape that conforms to each of the plurality of pipes, and wherein each of the plurality of longitudinal ribs tapers towards a top of the second end to accommodate the plurality of pipes.

In a further embodiment, the plurality of lateral ribs forms a plurality of circumferential rings. In another embodiment, each of the plurality of lateral ribs is a mechanical stop. In yet a further embodiment, the lateral rib closest to a top of the second end is a pipe stop.

In another embodiment, the plurality of pipes comprises at least three pipes. In a further embodiment, the at least three pipes have three varying pipe diameters. In still a further embodiment, the first pipe has a larger pipe diameter than a pipe diameter of each of the plurality of pipes. In yet a further embodiment, the first pipe is a corrugated pipe.

In yet another embodiment, the first end comprises a plurality of tabs, wherein each of the plurality of tabs snap fits the first pipe onto the first end.

In another embodiment, an adapter for a pipe comprises a first end, a second end, wherein the second end is tapered and comprises a plurality of lateral ribs and a plurality of longitudinal ribs, wherein each of the plurality of longitudinal ribs comprises a pliable and wedge-like shape, and wherein each of the plurality of longitudinal ribs tapers towards a top of the second end.

In a further embodiment, the first end fits a first pipe, wherein the first pipe is a corrugated pipe. In another embodiment, the first end comprises a plurality of tabs, wherein each of the plurality of tabs snap fits the first pipe onto the first end.

In a further embodiment, the second end is configured to connect a plurality of pipes, wherein each of the plurality of longitudinal ribs conforms to each of the plurality of pipes. In still a further embodiment, the plurality of pipes comprises at least three pipes, wherein the at least three pipes have three varying pipe diameters. In yet a further embodiment, the first pipe has a larger pipe diameter than a pipe diameter of each of the plurality of pipes.

BRIEF DESCRIPTION OF DRAWING(S)

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the present invention.

DETAILED DESCRIPTION

Reference will now be made in detail to embodiments of the present disclosure, shown in the accompanying drawings.

Figure 1:
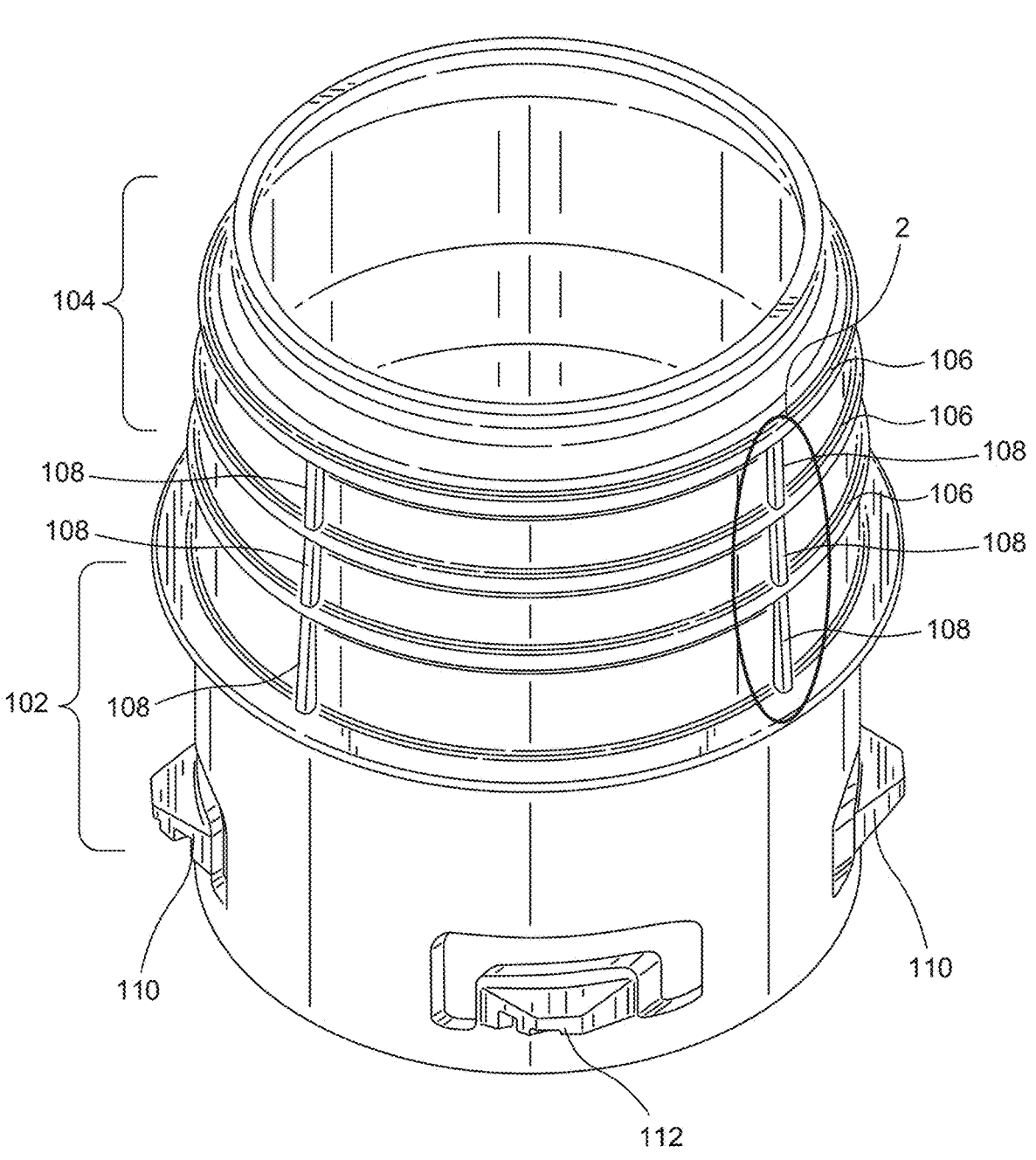
FIG. 1 illustrates a perspective view of an example of a coupling and adapter, consistent with disclosed embodiments.

FIG. 1 illustrates a perspective view of an example of a coupling 100, consistent with disclosed embodiments. The coupling 100 may be configured to connect, fit, and/or secure a first pipe to a plurality of pipes. As shown in FIG. 1, the coupling 100 may comprise a first end 102 configured to connect, fit, and/or secure the first pipe and a second end 104 configured to connect, fit, and/or secure a plurality of pipes. The first pipe and the plurality of pipes may be corrugated pipes, wherein such corrugated pipes comprise a series of ridges and grooves on their respective surfaces that allows for strength, rigidity, flexibility, and/or versatility. Alternatively, the first pipe and the plurality of pipes may be PVC (polyvinyl chloride) pipes, HDPE (high-density polyethylene) pipes, metal pipes, clay pipes, and/or concrete pipes, as need be.

Moreover, as can be seen from the respective circumferential diameter of each of the first end 102 and the second end 104 in FIG. 1, the first pipe that connects, fits, and/or secures to the first end 102 does indeed have a larger pipe diameter than each of the plurality of pipes that connects, fits, and/r secures to the second end 104. Also, the coupling 100 may be a 4-inch coupling 100. Moreover, the first end 102 may accommodate the aforementioned first pipe wherein the first pipe is a 4-inch corrugated pipe. Also, the second end 104 may accommodate a plurality of pipes, wherein the plurality of pipes may be at least three different pipes of three varying inner diameters and three varying outer diameters, wherein each of said varying inner diameters and/or varying outer diameters may be the same size or smaller than the diameter of the first pipe.

As can be further seen in FIG. 1, the first end 102 may comprise a plurality of tabs 110, wherein each of the plurality of tabs 110 may connect, fit, and/or secure the first pipe onto the first end 102. Specifically, such a connection may be a snap fit connection, wherein each of the tabs 110 snap-fits the first pipe onto the first end 102. As can be seen in FIG. 1, each of the tabs 110 may comprise a protruding feature 112 and/or an engagement surface 112 that may engage with a corresponding opening or receiving feature of the first pipe to securely, easily, and effectively snap-fit the first pipe onto the first end 102. Such a protruding feature 112 may be a flexible material and/or a flexible plastic that may be deformed during the snap-fitting connection. The tab 110 and the protruding feature 112 may be manufactured via molding (injection molding, blow molding, rotational molding, etc.), forming (thermoforming, roll forming, etc.), forging, stamping, casting, subtractive machining, extruding, 3D printing, and/or a combination of the aforementioned manufacturing methods, as appropriate.

Alternatively, such a connection to connect the first pipe onto the first end 102 may be a threaded connection that uses screw threads to connect the first pipe to the first end 102. In contrast, the connection may be a bayonet connection that uses a rotating locking mechanism to lock the first pipe onto the first end 102. In contrast, the connection may be a friction fit connection that uses the force of friction to hold the first pipe onto the first end 102. In turn, the connection may be a magnetic connection that uses a magnetic attraction to hold the first pipe onto the first end 102 and/or an adhesive connection that uses a binding agent to hold the first pipe onto the first end 102. It is noted that a plethora of other viable connections may be utilized to connect the first pipe onto the first end 102.

As seen in FIG. 1, the second end 104 may be a tapered end that tapers toward the top of the second end 104. The second end 104 may be configured to connect, fit, and/or secure a plurality of pipes, specifically a plurality of at least three pipes having three varying pipe diameters. Moreover, the second end 104 may comprise a plurality of lateral ribs 106 and a plurality of longitudinal ribs 108. Both the plurality of lateral ribs 106 and the plurality of longitudinal ribs 108 connect, secure, and/or fit each of the plurality of at least three pipes having three varying diameters to the second end 104.

As seen in FIG. 1, the plurality of lateral ribs 106 may form a plurality of circumferential rings 106 that allow for the effective connecting, securing, and/or fitting of each of the plurality of at least three pipes having three varying diameters to the second end 104. Also, the plurality of lateral ribs 106 may form a plurality of mechanical stops 106. Moreover, the plurality of lateral ribs 106 may form a plurality of mechanical stops 106 for each of the aforementioned plurality of pipes. Also, the lateral rib 106 closest to the top of the second end 104 may be a pipe stop. Moreover, as seen in FIG. 1, the circumferential diameters of each of the plurality of lateral ribs 106 varies, wherein the diameter of the rib 106 closest to the top end of the second end 104 is smallest and the diameter of the rib 106 closest to the bottom end of the second end 104 is the largest—due to the aforementioned tapering nature of the second end 104. Also, each of the diameters of the plurality of ribs 106 correlates to the diameter of the appropriate pipe that is inserted into the second end 104.

As seen in FIG. 1, the plurality of longitudinal ribs 108 may comprise a plurality of pliable and wedge-like shapes that conforms to each of the plurality of pipes inserted into the second end 104. This, in turn, allows the plurality of longitudinal ribs 108 to conform to each of the plurality of pipes inserted into the second 104, thereby ensuring a safe, secure, snug, and facile connection of the plurality of pipes into the second end 104. Moreover, as seen in FIG. 1, each of the plurality of longitudinal ribs 108 tapers towards the top of the second end 104, thereby allowing for the accommodation of the plurality of pipes with varying diameters onto the second end 104, in a secure, safe, snug, and facile manner.

The aforementioned structural features of the coupling 100, for example, the aforementioned plurality of lateral ribs 106 and the plurality of longitudinal ribs 108 allow for a compatible and versatile coupling 100. Such a highly-compatible and versatile coupling 100 allows a user(s) and/or practitioner(s) to connect and fit one pipe to pipes of various inner diameters, in a secure, snug, quick, effective, and facile manner. Moreover, as seen in FIG. 1, the circled region 2 encircles a plurality of lateral ribs 106 and a plurality of longitudinal ribs 108 that are shown in more detail in FIG. 2 and discussed below.

Figure 2:
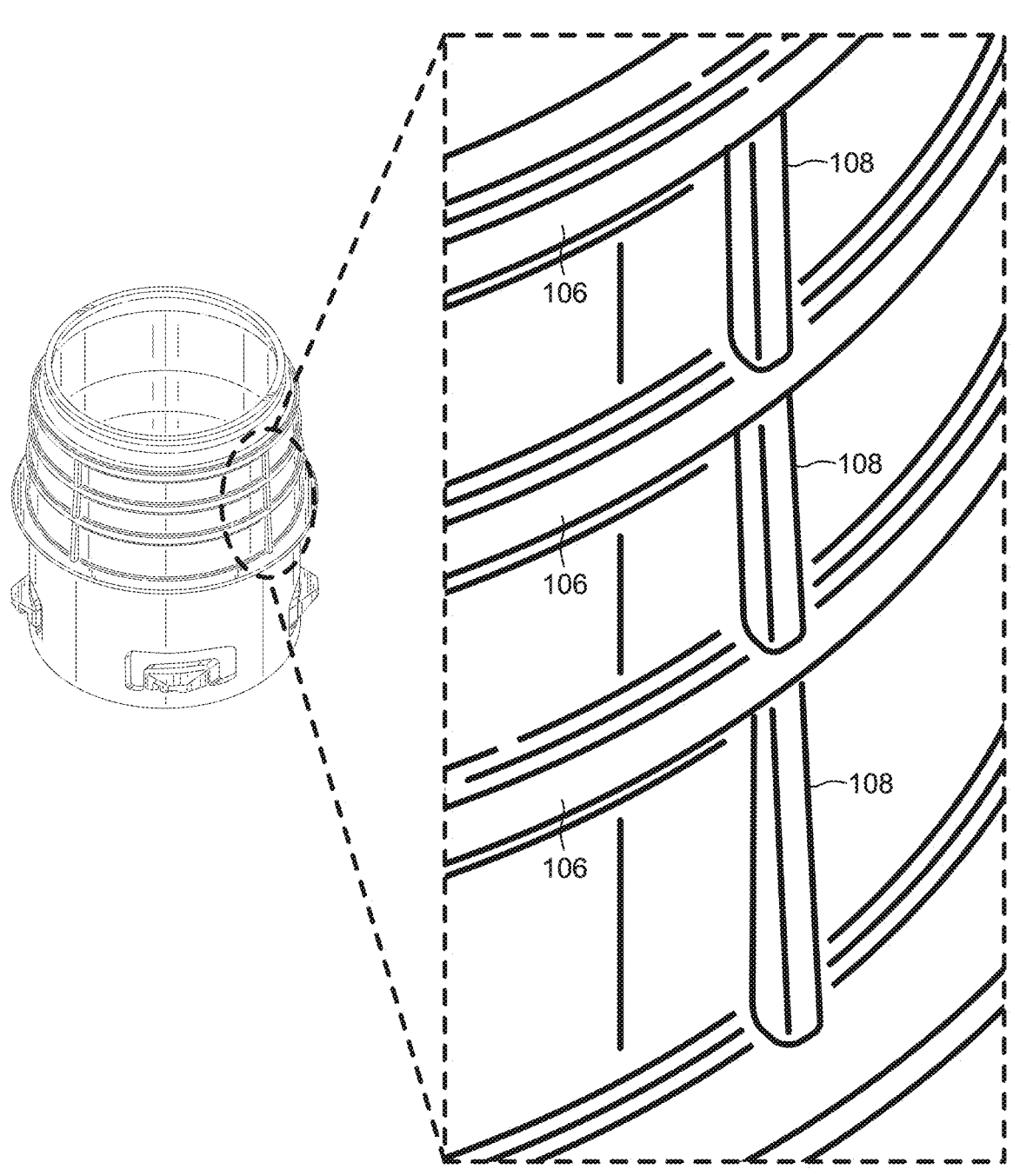
FIG. 2 illustrates a closer view of a region of the example of a coupling and adapter depicted in FIG. 1, consistent with disclosed embodiments.

FIG. 2 illustrates a closer view of the circled region 2 of FIG. 1. As seen in FIG. 2, each of the longitudinal ribs 108 comprises a pliable wedge-like shape that allows for the accommodation of the plurality of pipes of varying diameters. This wedge-like shape of each of the plurality of longitudinal ribs 108, along with the tapering of each of the plurality of longitudinal ribs 108 towards the top of the second end 104, allows for the safe, secure, snug, and facile connection of the plurality of pipes onto the second end 104. Moreover, the aforementioned tapering of each of the plurality of longitudinal ribs 108 towards the top of the second end 104 allows for the accommodation of a plurality of pipes of varying circumferential diameters, as need be.

Figure 3:
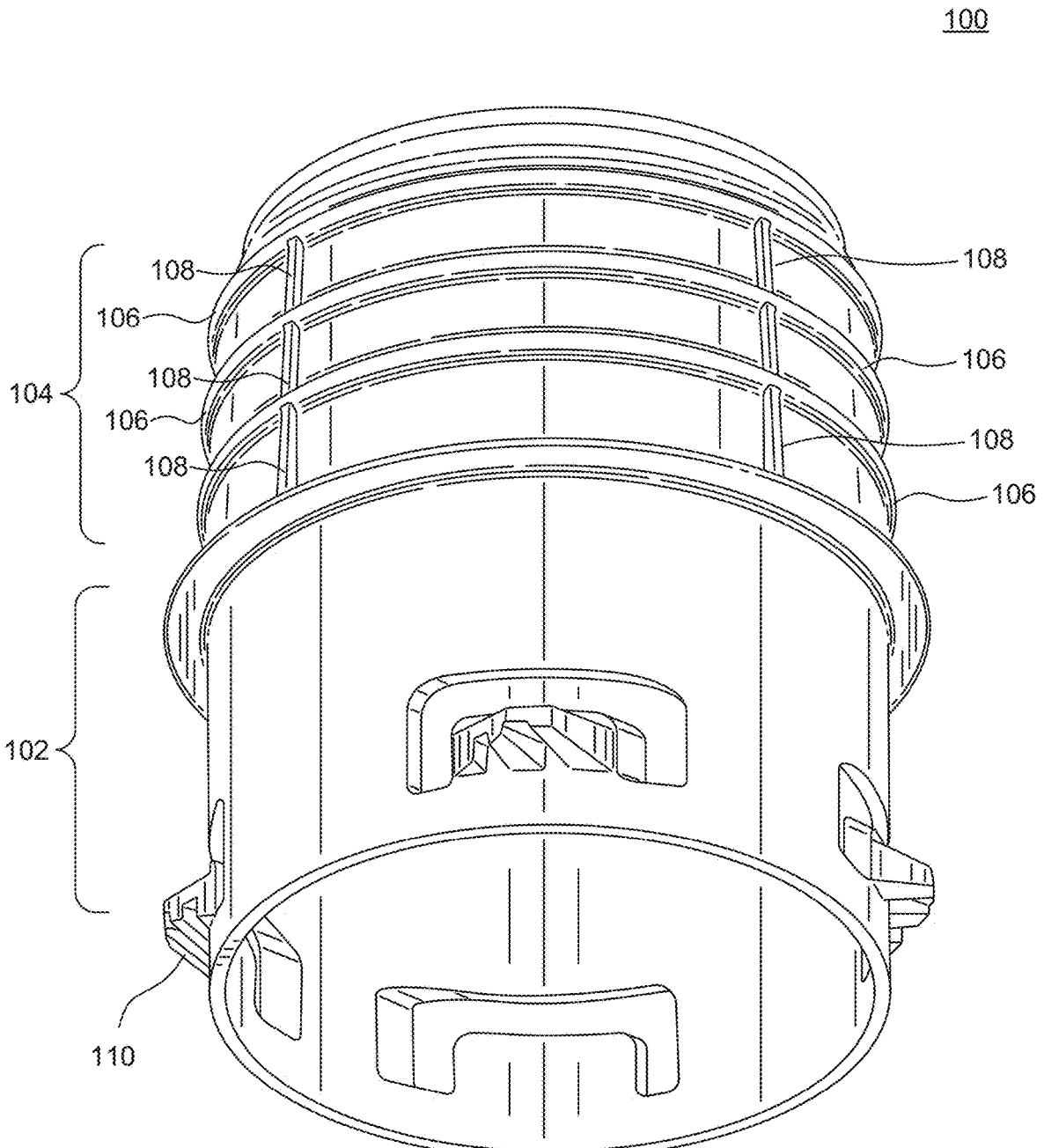
FIG. 3 illustrates a perspective view of an example of a coupling and adapter, consistent with disclosed embodiments.

FIG. 3 illustrates a perspective view of the coupling 100, from the first end 102 to the second end 104. Note that the aforementioned elements of the coupling 100 are all present in FIG. 3. For example, FIG. 3 shows the first end 102's plurality of tabs 110, wherein each tab 110 further comprises a protruding feature 112 and/or an engagement surface 112. Moreover, FIG. 3 also shows the second end 104's plurality of lateral ribs 106 and the plurality of tapering longitudinal rubs 108.

Figure 4:
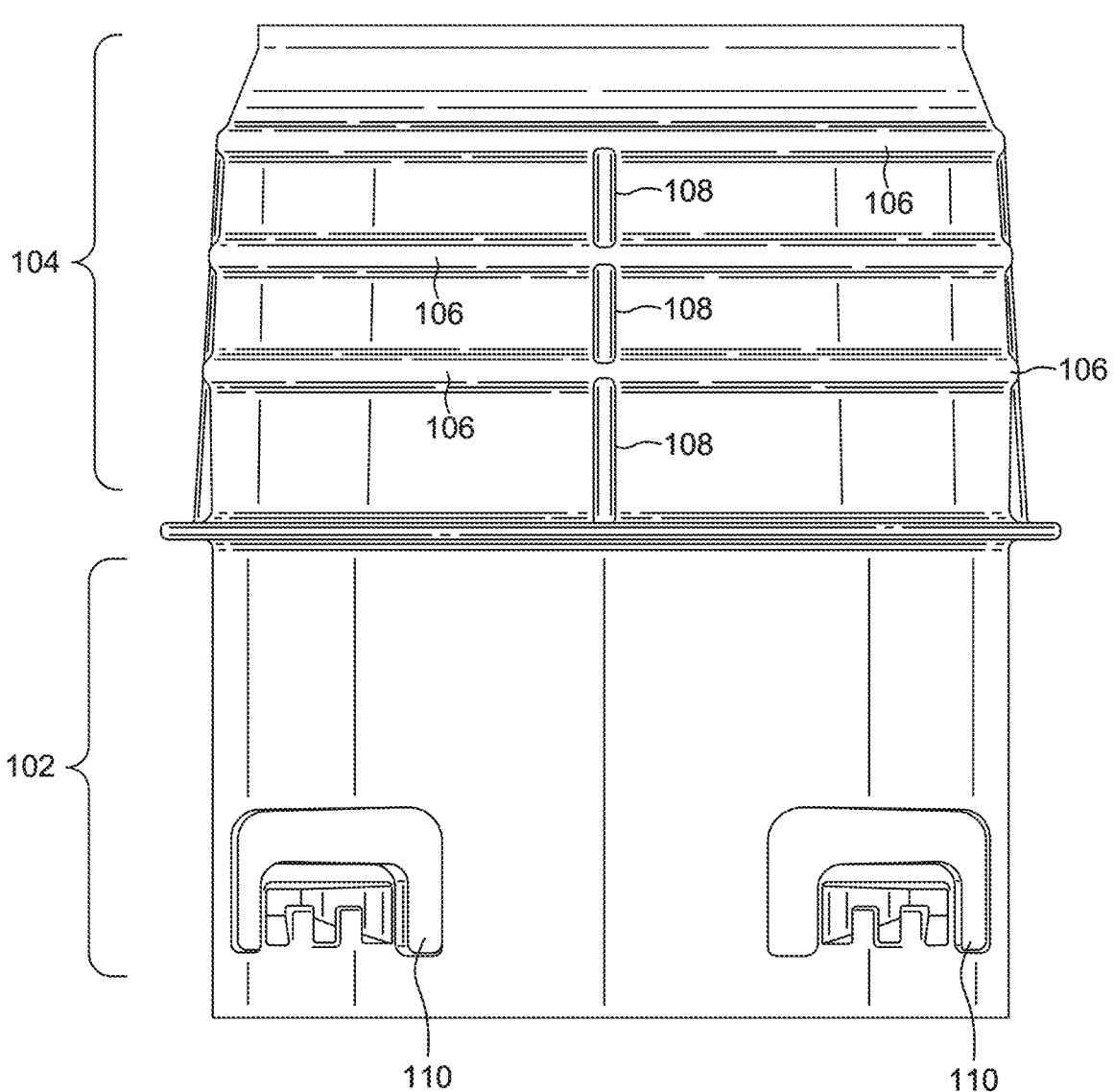
FIG. 4 illustrates a front view of an example of a coupling and adapter, consistent with disclosed embodiments.

FIG. 4 illustrates a front view of the coupling 100, along with the first end 102 and the second end 104. For example, FIG. 4 shows the first end 102's plurality of tabs 110. Moreover, FIG. 4 also shows the second end 104's plurality of lateral ribs 106 and the plurality of tapering longitudinal rubs 108. Note that FIG. 4 clearly shows that the circumferential diameters of each of the plurality of lateral ribs 106 varies, wherein the diameter of the rib 106 closest to the top end of the second end 104 is smallest and the diameter of the rib 106 closest to the bottom end of the second end 104 is the largest.

Figure 5:
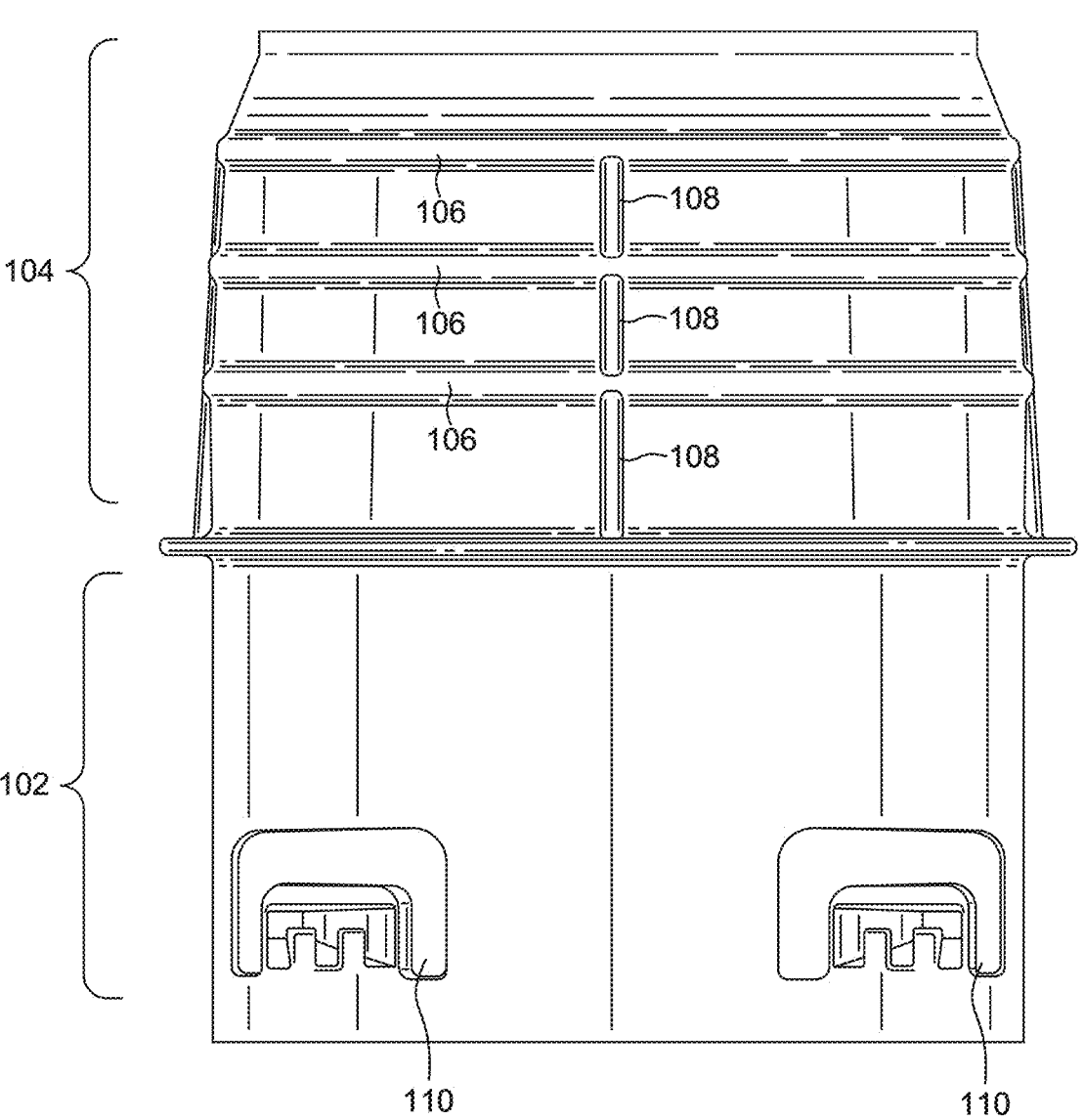
FIG. 5 illustrates a back view of an example of a coupling and adapter, consistent with disclosed embodiments.

FIG. 5 illustrates a back view of the coupling 100, along with the first end 102 and the second end 104. For example, FIG. 5 shows the first end 102's plurality of tabs 110. Moreover, FIG. 5 also shows the second end 104's plurality of lateral ribs 106 and the plurality of tapering longitudinal rubs 108. Note that FIG. 5 clearly shows that the circumferential diameters of each of the plurality of lateral ribs 106 varies, wherein the diameter of the rib 106 closest to the top end of the second end 104 is smallest and the diameter of the rib 106 closest to the bottom end of the second end 104 is the largest.

Figure 6:
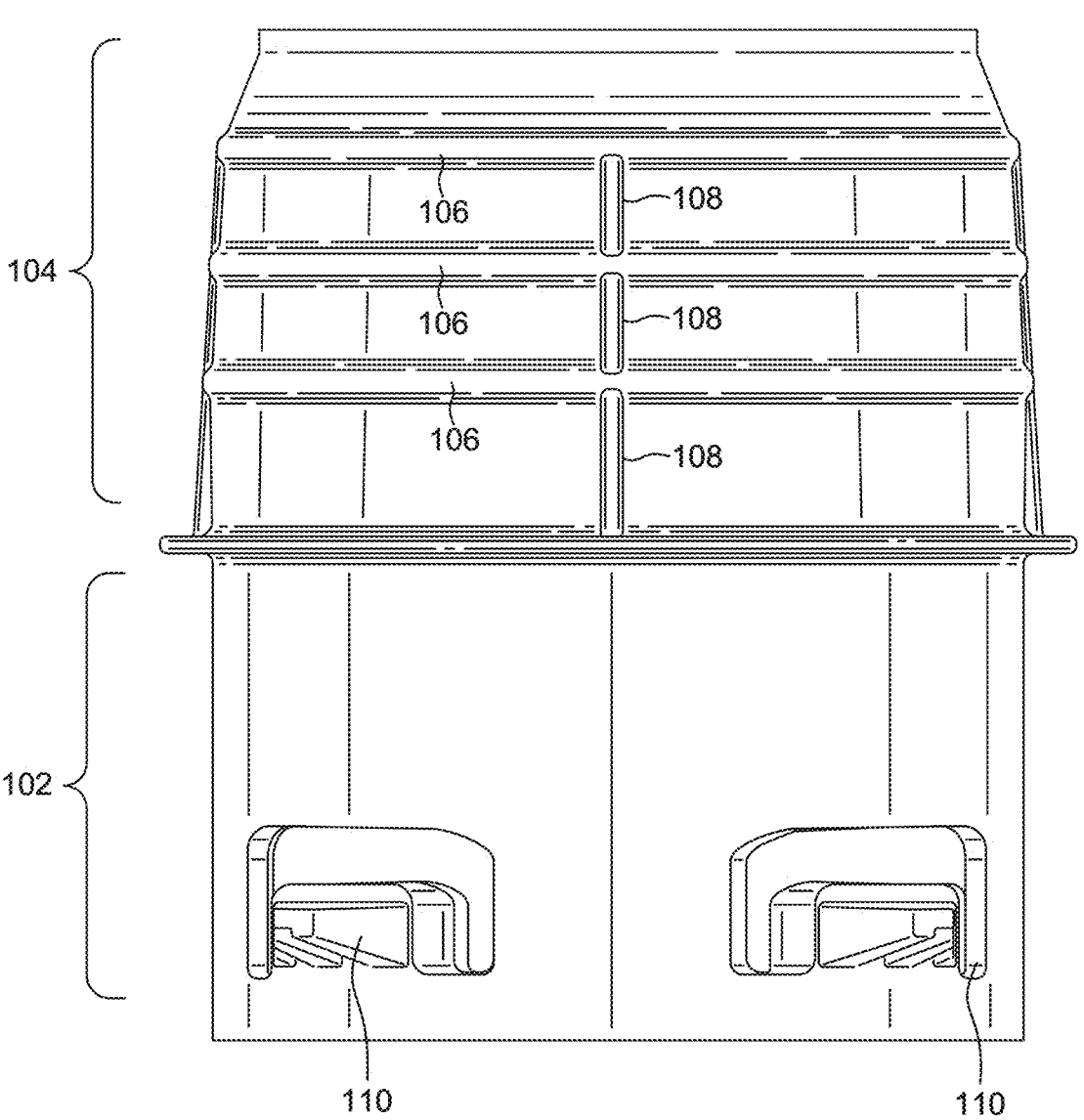
FIG. 6 illustrates a right view of an example of a coupling and adapter, consistent with disclosed embodiments.

FIG. 6 illustrates a right view of the coupling 100, along with the first end 102 and the second end 104. For example, FIG. 6 shows the first end 102's plurality of tabs 110. Moreover, FIG. 6 also shows the second end 104's plurality of lateral ribs 106 and the plurality of tapering longitudinal rubs 108. Note that FIG. 6 clearly shows that the circumferential diameters of each of the plurality of lateral ribs 106 varies, wherein the diameter of the rib 106 closest to the top end of the second end 104 is smallest and the diameter of the rib 106 closest to the bottom end of the second end 104 is the largest.

Figure 7:
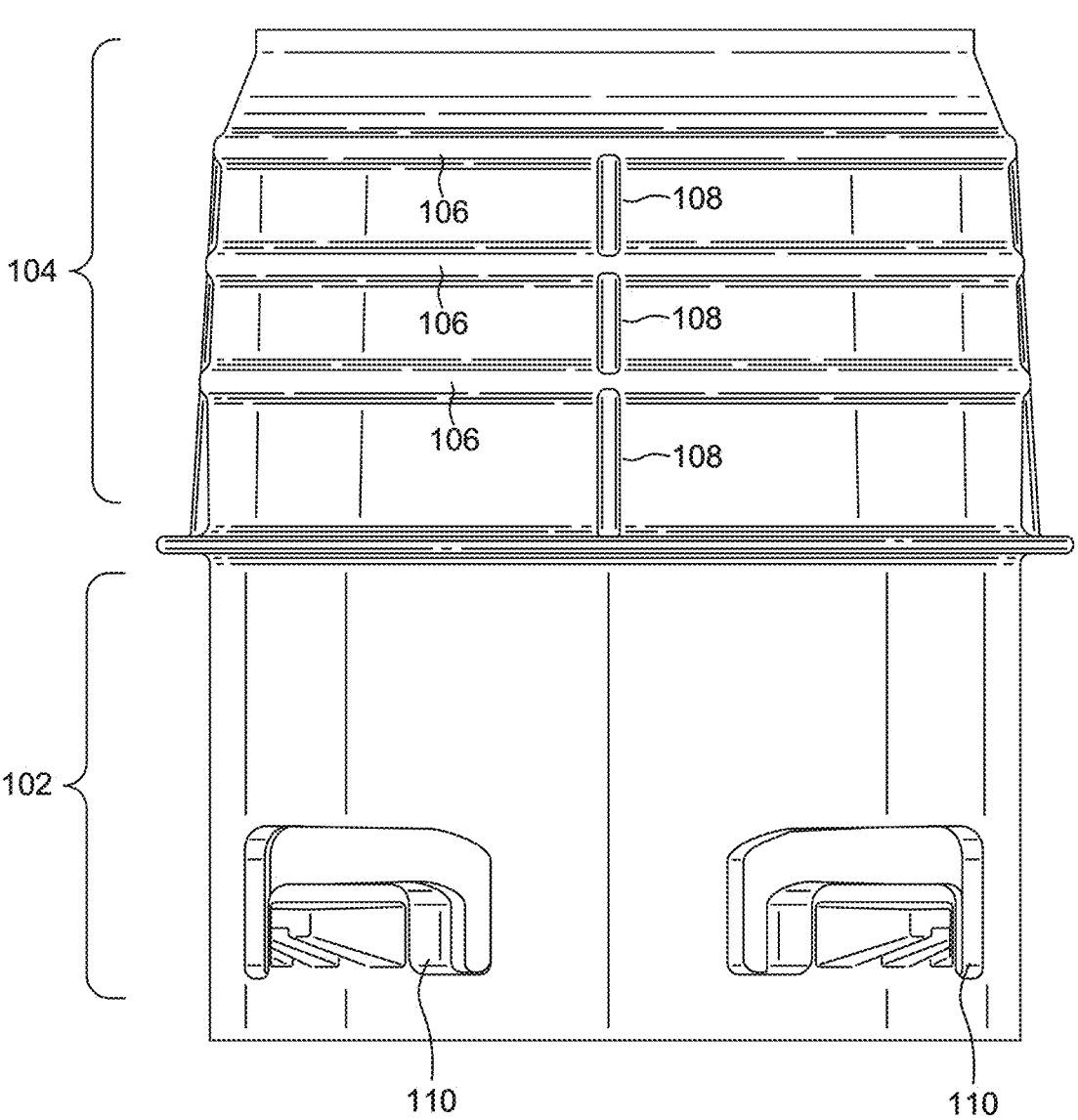
FIG. 7 illustrates a left view of an example of a coupling and adapter, consistent with disclosed embodiments.

FIG. 7 illustrates a left view of the coupling 100, along with the first end 102 and the second end 104. For example, FIG. 7 shows the first end 102's plurality of tabs 110. Moreover, FIG. 7 also shows the second end 104's plurality of lateral ribs 106 and the plurality of tapering longitudinal rubs 108. Note that FIG. 7 clearly shows that the circumferential diameters of each of the plurality of lateral ribs 106 varies, wherein the diameter of the rib 106 closest to the top end of the second end 104 is smallest and the diameter of the rib 106 closest to the bottom end of the second end 104 is the largest.

Figure 8:
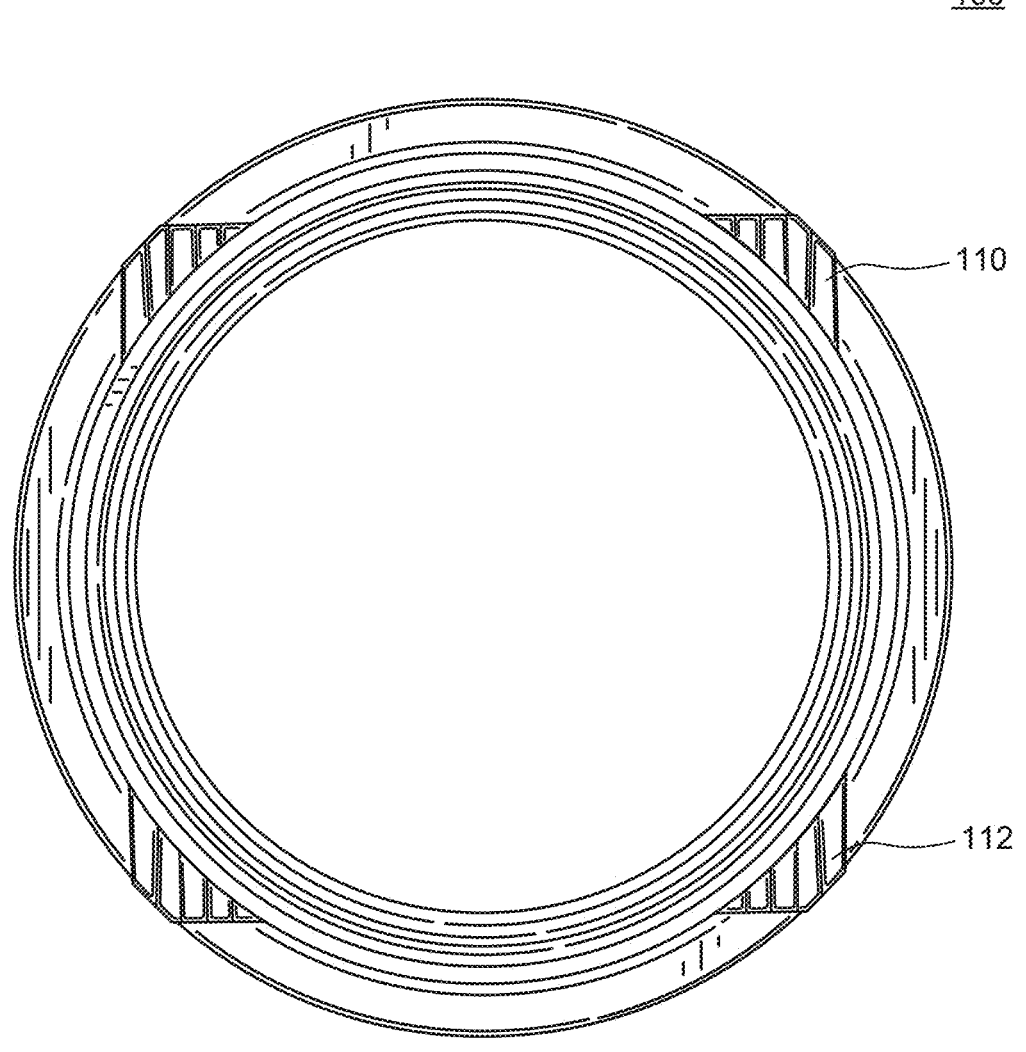
FIG. 8 illustrates a bottom view of an example of a coupling and adapter, consistent with disclosed embodiments.

FIG. 8 illustrates a bottom view of the coupling 100, from the view of the first end 102. For example, FIG. 8 especially shows the first end 102's plurality of tabs 110, wherein each tab 110 further comprises a protruding feature 112 and/or an engagement surface 112.

Figure 9:
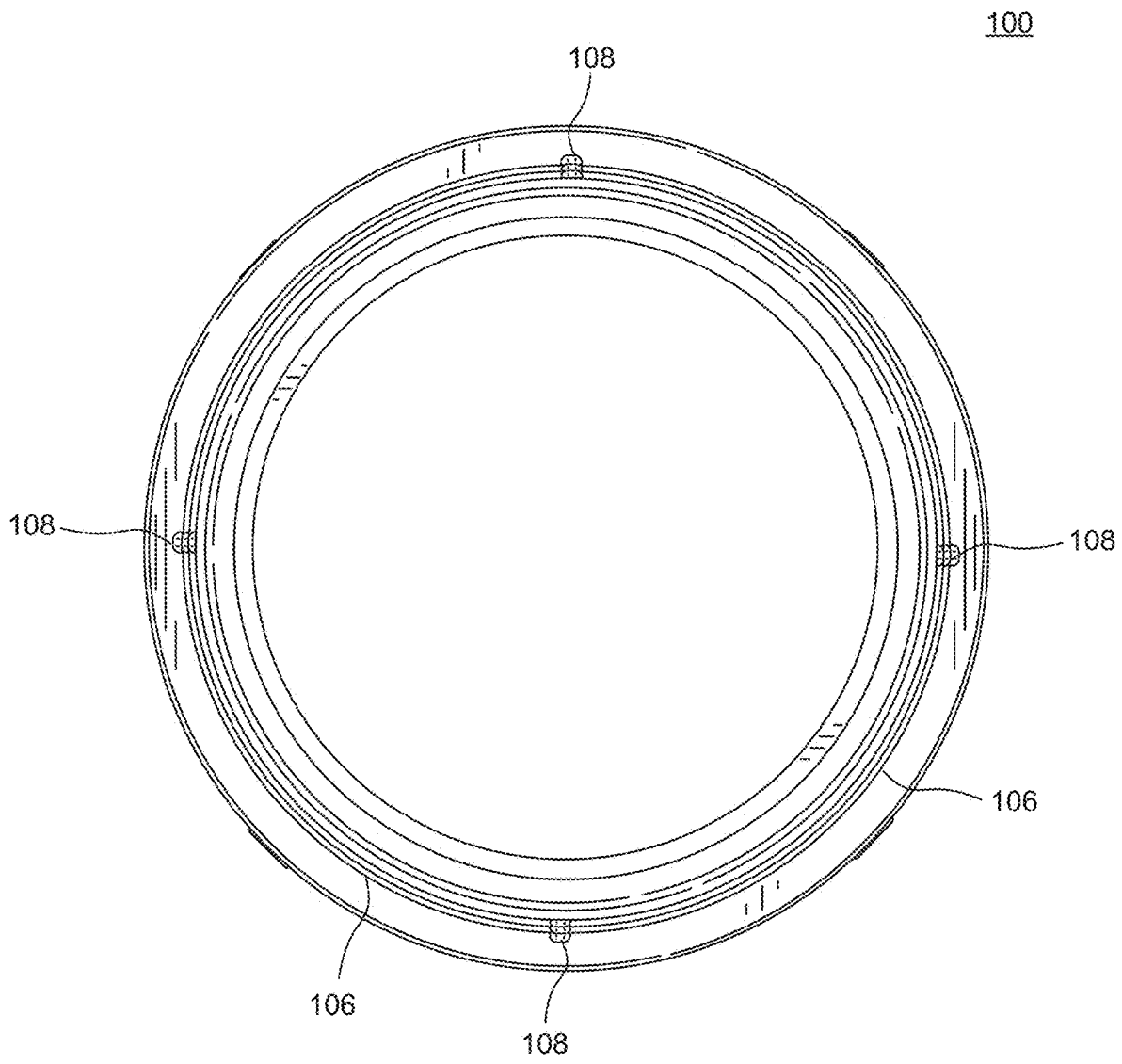
FIG. 9 illustrates a top view of an example of a coupling and adapter, consistent with disclosed embodiments.

FIG. 9 illustrates a top view of the coupling 100, from the view of the second end 104. For example, FIG. 9 especially shows the second end 104's plurality of lateral ribs 106 and plurality of longitudinal ribs 108.

The aforementioned coupling 100 may be manufactured from various materials, including metal, plastic, rubber, cast iron, brass, bronze, composite materials, and/or a combination of one or more of the aforementioned materials. Moreover, the coupling 100 may be manufactured via molding (injection molding, blow molding, rotational molding, etc.), forming (thermoforming, roll forming, etc.), forging, casting, subtractive machining, stamping, extruding, 3D printing, and/or a combination of the aforementioned manufacturing methods, as appropriate.

It will be apparent to persons skilled in the art that various modifications and variations can be made to the disclosed structure. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A coupling configured to connect a first pipe to a second pipe, the second pipe being one of a plurality of pipes of varying diameters comprising:
   a first end, wherein the first end comprises a plurality of tabs configured to connect the first end to the first pipe; and
   a second end configured to connect to the second pipe;
   wherein the second end is a tapered end that comprises a plurality of lateral ribs and a plurality of longitudinal ribs; and
   wherein each of the plurality of longitudinal ribs extends between each of the plurality of lateral ribs.

2. The coupling of claim 1, wherein each of the plurality of longitudinal ribs comprises a pliable and wedge-like shape configured to conform to each of the plurality of pipes.

3. The coupling of claim 1, wherein each of the plurality of longitudinal ribs tapers towards a top of the second end and is configured to accommodate each of the plurality of pipes.

4. The coupling of claim 1, wherein each of the plurality of tabs comprises a protruding end.

5. The coupling of claim 4, wherein the protruding end is configured to engage with a corresponding opening in the first pipe.

6. The coupling of claim 4, wherein the protruding end comprises a flexible material configured to conform to the first pipe.

7. The coupling of claim 4, wherein each of the plurality of tabs snap fits the first pipe onto the first end.

8. The coupling of claim 1, wherein a diameter of the first pipe is larger than a diameter of each of the plurality of pipes.

9. The coupling of claim 1, wherein the plurality of lateral ribs forms a plurality of circumferential rings.

10. The coupling of claim 1, wherein each of the plurality of lateral ribs is a mechanical stop.

11. The coupling of claim 1, wherein the plurality of pipes comprises at least three pipes.

12. The coupling of claim 11, wherein the at least three pipes have three different pipe diameters.

13. The coupling of claim 1, wherein the first pipe is a corrugated pipe.

14. A coupling for a pipe, comprising:

a first end, wherein the first end comprises a plurality of tabs; and a second end;

wherein the second end is a tapered end that comprises a plurality of lateral ribs and a plurality of longitudinal ribs; and wherein each of the plurality of longitudinal ribs extends between each of the plurality of lateral ribs.

15. The coupling of claim 14, wherein the plurality of tabs is configured to connect the first end to a first pipe.

16. The coupling of claim 14, wherein the second end is configured to connect to one of a plurality of second pipes, wherein diameters of each of the plurality of second pipes vary.

17. The coupling of claim 16, wherein a diameter of the first pipe is greater than the diameters of each of the plurality of second pipes.

18. The coupling of claim 16, wherein each of the plurality of longitudinal ribs is configured to accommodate each of the plurality of second pipes.

19. The coupling of claim 14, wherein each of the plurality of longitudinal ribs comprises a pliable and wedge-like shape.

20. The coupling of claim 14, wherein each of the plurality of longitudinal ribs tapers towards a top of the second end.

* * * * *